(12) United States Patent
Kubesh et al.

(10) Patent No.: US 11,506,102 B2
(45) Date of Patent: Nov. 22, 2022

(54) EXHAUST GAS ELECTROCHEMICAL ENERGY RECOVERY SYSTEM

(71) Applicant: Southwest Research Institute, San Antonio, TX (US)

(72) Inventors: Matthew Kubesh, Fair Oaks Ranch, TX (US); Ian Smith, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 17/452,274

(22) Filed: Oct. 26, 2021

(65) Prior Publication Data

US 2022/0127994 A1    Apr. 28, 2022

Related U.S. Application Data

(60) Provisional application No. 63/198,536, filed on Oct. 26, 2020.

(51) Int. Cl.
*F01N 3/36* (2006.01)
*F02D 41/06* (2006.01)
*F01N 3/10* (2006.01)
*F02D 41/02* (2006.01)

(52) U.S. Cl.
CPC .............. *F01N 3/36* (2013.01); *F01N 3/101* (2013.01); *F02D 41/062* (2013.01); *F01N 2240/32* (2013.01); *F01N 2610/02* (2013.01); *F01N 2610/04* (2013.01); *F01N 2610/06* (2013.01); *F02D 41/021* (2013.01); *H01M 2250/20* (2013.01)

(58) Field of Classification Search
CPC ........ F01N 3/101; F01N 3/36; F01N 2240/32; F01N 2610/02; F01N 2610/04; F01N 2610/06; F02D 41/021; F02D 41/062; H01M 2250/20
See application file for complete search history.

(56) References Cited

U.S. PATENT DOCUMENTS

| | | | |
|---|---|---|---|
| 6,230,494 | B1 | 5/2001 | Botti et al. |
| 6,994,930 | B1 | 2/2006 | Geisbrecht et al. |
| 8,962,202 | B2 | 2/2015 | Chung |
| 2003/0134169 | A1 | 7/2003 | Sarkar et al. |

(Continued)

FOREIGN PATENT DOCUMENTS

| | | | | |
|---|---|---|---|---|
| EP | 1047144 | | 10/2000 | |
| WO | WO-2022011275 | A1 * | 1/2022 | ............. F02D 13/06 |

OTHER PUBLICATIONS

International Search Report and Written Opinion from corresponding PCT Appln. No. PCT/US2021/072028, dated Jan. 26, 2022.

(Continued)

*Primary Examiner* — Audrey B. Walter
(74) *Attorney, Agent, or Firm* — Grossman, Tucker, Perreault & Pfleger, PLLC

(57) ABSTRACT

The present invention is directed at the integration of a solid oxide fuel cell (SOFC) into the exhaust stream of an internal combustion engine aided by the upstream injection of a fuel, such as a hydrocarbon fuel. The internal combustion engine may be advantageously operated in a lean condition while the SOFC receives the hydrocarbon fuel to promote and maintain optimized fuel cell operation.

19 Claims, 3 Drawing Sheets

(56) References Cited

U.S. PATENT DOCUMENTS

| | | |
|---|---|---|
| 2004/0177607 A1* | 9/2004 | Suzuki .................... F01N 5/00 60/285 |
| 2007/0186537 A1 | 8/2007 | Elwart et al. |
| 2008/0090113 A1 | 4/2008 | Keefer et al. |
| 2009/0282812 A1* | 11/2009 | Hu ....................... B60W 10/28 60/285 |
| 2010/0275679 A1 | 11/2010 | Wang et al. |
| 2015/0119623 A1 | 4/2015 | Huang |
| 2020/0052316 A1 | 2/2020 | Ahn et al. |

OTHER PUBLICATIONS

Huang et al., Solid Oxide Fuel Cell Technology: Principles, Performance and Operations, CRC Press, 2009, pp. 8-9, 12-13, 86-91, 142-143, 184-185, 278-279, 284-285 & 286-287.

Kumar et al., "Solid Oxide Fuel Cells for Transportation: A Clean, Efficient Alternative for Propulsion", Proceedings of the Electrochemical Society, PV Apr. 1993, 948-956 (1993).

Welles et al., "A Novel Solid Oxide Fuel Cell Based Catalytic Converter Replacement for Enhanced Emission Control and Power Generation in Automotive E, xhaust", SAE Technical Paper 2020-01-0353, 2020, pp. 1-10.

\* cited by examiner

EXHAUST GAS ELECTROCHEMICAL ENERGY RECOVERY SYSTEM

FIELD

The present invention is directed at the integration of a solid oxide fuel cell into the exhaust stream of an internal combustion engine aided by the upstream injection of a fuel, such as a hydrocarbon fuel.

BACKGROUND

Internal combustion engines (ICE) generate a relatively high amount of waste heat that is then expelled to the environment as exhaust gas. The exhaust gas also contains many unwanted products of incomplete combustion reactions, such as oxides of nitrogen, carbon monoxide as well as unburned hydrocarbons. Over time, the regulations of such exhaust emission have become more restrictive. As these regulations on emissions and fuel economy tighten, the effectiveness of relying of traditional catalytic aftertreatment devices becomes more challenged.

Accordingly, the need for a next generation aftertreatment system becomes more prevalent. In such regard, solid oxide fuel cells (SOFC) have been identified for treatment of exhaust in gas turbine power plants. A need remains for improved designs and use of SOFC within the exhaust streams of internal combustion engines to optimize their performance and reduce the environmental issues regarding vehicular exhaust.

SUMMARY

A method for operating an exhaust system of an internal combustion engine comprising providing an exhaust conduit configured to receive exhaust from an internal combustion engine and providing a secondary fuel injector positioned in the exhaust conduit configured to introduce a fuel along with a solid oxide fuel cell (SOFC) positioned downstream from the secondary fuel injector, wherein the SOFC is configured to receive both said exhaust and fuel from said secondary fuel injector. The engine may then be operated at an equivalency ratio of 1.0 to 1.1 to heat the solid oxide fuel cell to a temperature in the range of 500° C. to 1000° C. followed by operating the engine at an equivalency ratio of 0.50 to 0.77, and injecting fuel from the secondary fuel injector into the exhaust conduit wherein the fuel is then introduced into the solid oxide fuel cell.

A method for operating an exhaust system of an internal combustion engine comprising providing an exhaust conduit configured to receive exhaust from an internal combustion engine and providing a secondary fuel injector positioned in said exhaust conduit configured to introduce a fuel along with a solid oxide fuel cell (SOFC) downstream from the secondary fuel injector positioned to receive both the exhaust and fuel from the fuel injector. One then provides an engine electronic control module and a SOFC electronic control module wherein the SOFC control module directs the electronic engine control module to operate the engine at an equivalency ratio of 1.0 to 1.1 to heat the solid oxide fuel cell to a temperature in the range of 500° C. to 1000° C. followed by operating the engine at an equivalency ratio of 0.50 to 0.77, and wherein the SOFC electronic control module directs the injection of fuel from the secondary fuel injector into the exhaust conduit wherein the fuel is then introduced into the solid oxide fuel cell.

An exhaust system for an internal combustion engine comprising an exhaust conduit configured to receive exhaust from an internal combustion engine; a secondary fuel injector positioned in the exhaust conduit configured to introduce a fuel; and a solid oxide fuel cell (SOFC) positioned to receive both the exhaust and introduced fuel.

BRIEF DESCRIPTION OF THE DRAWINGS

The present invention will be more fully understood by reference to the following drawings in which.

DETAILED DESCRIPTION

The present invention is directed at the integration of a solid oxide fuel cell (SOFC) into the exhaust stream of an internal combustion engine aided by the upstream introduction of a secondary injection of a fuel, more preferably a hydrocarbon fuel. The SOFC will also allow for aftertreatment of exhaust emissions, such as oxides of carbon and nitrogen as well as any excess hydrocarbons. The SOFC would also provide for power generation (electricity) from the electrochemical reaction occurring from oxidizing of a fuel therein. As noted, a secondary fuel injection is provided upstream of the SOFC to take further advantage of the relatively high fuel conversion efficiency that a SOFC will provide. The SOFC may also preferably be configured in a modular/tubular configuration. Preferably, the secondary fuel as a hydrocarbon is natural gas, methane or propane. The secondary fuel is also contemplated to include hydrogen and ammonia.

Reference to a SOFC herein may be broadly understood as a device that generates electricity by a chemical reaction. The SOFC preferably employs a solid oxide electrolyte to conduct negative ions from the cathode to the anode. An electrochemical oxidation of hydrogen, carbon monoxide or other organic intermediates by oxygen ions occurs on the anode side. That is, oxygen is supplied at the cathode side, oxygen ions migrate through the electrolyte to the anode, and hydrogen introduced at the anode is converted to water, with the output of an electricity from the anode to the cathode. The SOFC typically operates at 500° C. to 1000° C.

Figure 1:
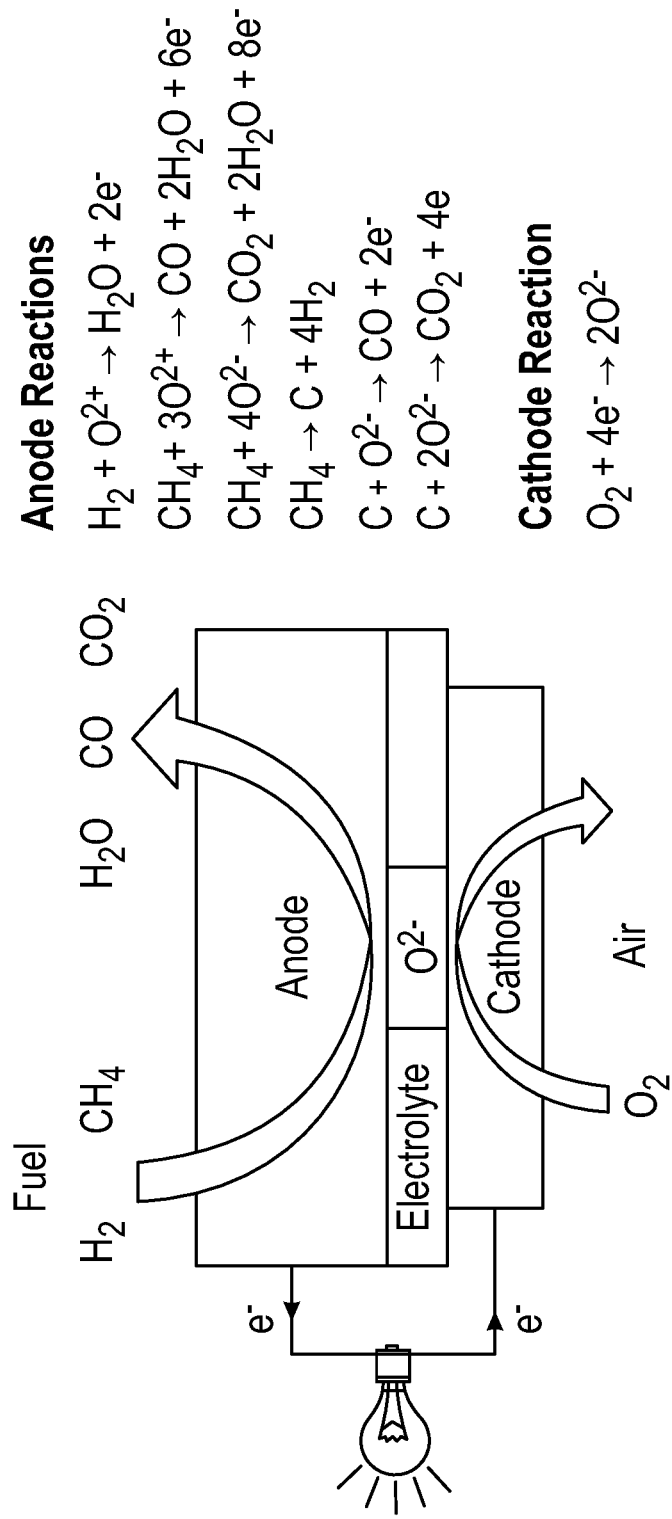
FIG. 1 illustrates the reactions with a SOFC.

Expanding on the above, attention is directed to FIG. 1 which illustrates the reactions within the preferred SOFC. With use of a preferred nickel-yittria-stabilized zirconia anode (Ni—YSZ) along with a preferred lanthanium strontium manganite yittria-stabilized zirconia cathode (LSLM-YSZ), $NO_2$ and NO can be converted to $N_2$ gas. That is, the cathode layer is able to react with NOx in lean conditions and at the preferred temperatures of 500° C. to 1000° C. As illustrated, the cathode layer will decompose NO in to $N_2$ allowing the oxygen ions to travel through the electrolyte layer to react with other emissions, such as CO and $H_2$. The NO reduction reaction as shown is as follows:

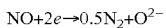

$$NO + 2e^- \rightarrow 0.5N_2 + O^{2-}$$

Figure 2:
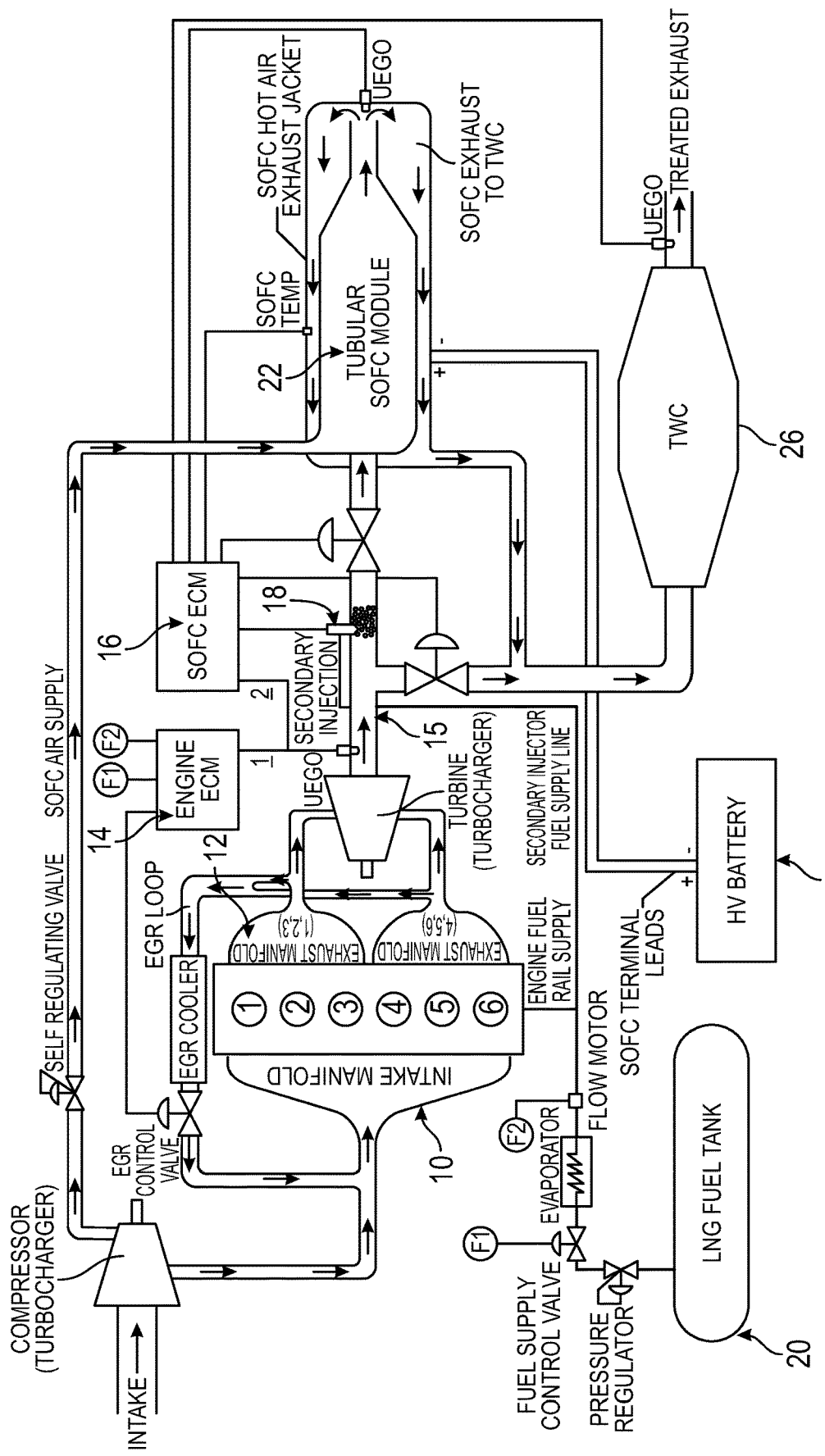
FIG. 2 is a schematic view of a SOFC within an internal combustion engine.

Attention is directed to FIG. 2 which provides a schematic view of a preferred tubular SOFC within an internal combustion engine having the identified exhaust system. More specifically, internal combustion engine includes an intake manifold 10, exhaust manifold 12, an engine electronic control module (ECM) 14 and an SOFC electronic control module 16 that is in communication with a fuel injector 18 that is supplied by, e.g., a preferred hydrocarbon fuel such as liquified natural gas (LNG) at 20. The SOFC electronic control module also is in communication and monitors the temperature of the SOFC as well as the read-outs of the universal exhaust gas oxygen sensor (UEGO) sensors positioned at the exit of the SOFC and the TWC converter 26. The SOFC electronic control module can also monitor SOFC cell output voltage, SOFC current density, and oxygen and water concentration downstream of the SOFC and oxygen concentration upstream of the SOFC. The SOFC electronic control module 16 is also in communication with the engine electronic control module 14 and can therefore direct the engine as needed to run at an equivalency ratio of 1.0 to 1.1, to maintain the temperature of the SOFC in the range of 500° C. to 1000° C. A preferred tubular SOFC module is shown at 22, but as noted, the SOFC is not limited herein to a tubular configuration.

As now can be appreciated, the introduction of the fuel, which as noted may comprise a hydrocarbon fuel, preferably takes place at the injector 18 in the exhaust conduit 15 and therefore upstream of SOFC module 22. As can be seen, the exhaust conduit is configured to receive exhaust from the ICE and the hydrocarbon fuel is therefore introduced into the exhaust prior to the introduction of the exhaust and fuel into the SOFC. The SOFC may then include output lines for its electrical energy output which may be utilized for charging a relatively high voltage (HV) battery pack 24. For example, the high voltage batteries that are employed in hybrid type vehicles (e.g. batteries that produce 100 to 300 volts of electricity). As can also be seen, the internal combustion engine can optionally include a three-way catalytic converter (TWC) at 26. The TWC converter is configures to receive exhaust directly from said exhaust conduit 15 and/or to receive exhaust that has passed through the SOFC. Reference to a TWC converter is reference to a converter that oxidizes carbon monoxide and hydrocarbons and which reduces nitrogen oxides.

As can initially be appreciated from the above, an internal combustion engine with the SOFC as shown in FIG. 1 is such that that the SOFC will act as a catalyst for aftertreatment of exhaust emissions. This will then serve to reduce tailpipe emissions such as CO and unburned hydrocarbons. In addition, the process makes use of the thermal energy typically lost to the environment and employs the heat in the exhaust gas to negate the required startup energy otherwise needed to achieve SOFC operating temperature that may fall in the range of 500° C. to 1000° C.

Figure 3:
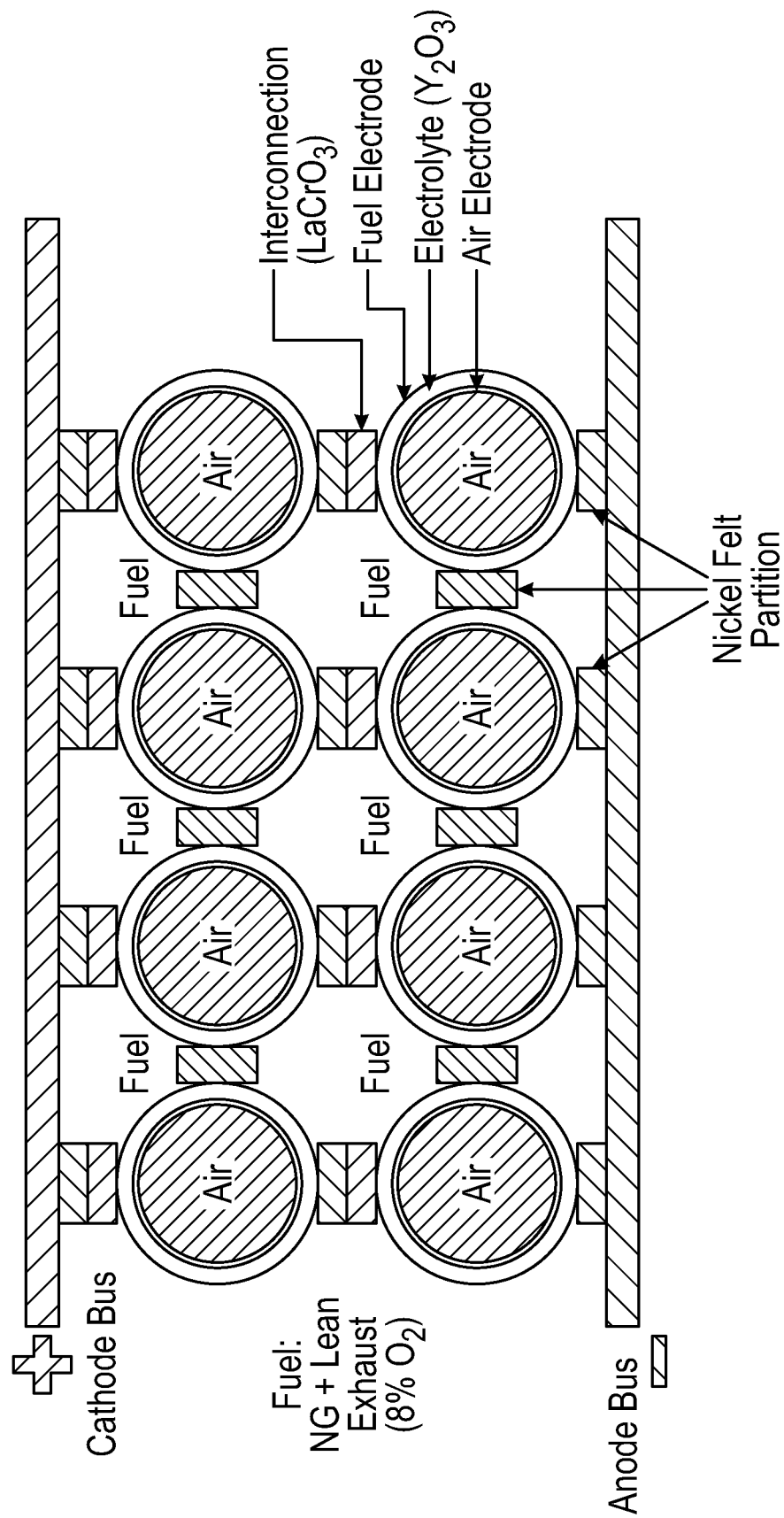
FIG. 3 provides a cross-section of one preferred tubular SOFC design.

Preferably, as noted, the SOFC module is of a tubular design. This is reference to the feature that the module has a generally elongated structure. FIG. 3 provides a cross-section of one preferred tubular SOFC design.

It is therefore now worth mentioning other aspects regarding the secondary fuel injection upstream of the SOFC module, one of which is to take advantage of the relatively high fuel conversion efficiencies that SOFC's can provide (>65%). With the addition of a secondary injection upstream of the SOFC module and preferably, along with the use of a universal exhaust gas oxygen sensor (UEGO) and heated exhaust gas sensor (HEGO) sensor post module, the exhaust system can preferably be controlled in a stoichiometric state. This then allows the engine to be switched into lean burn operation (excess of air in the combustion chamber) while still allowing the use of a three-way catalyst (TWC) at the end of the exhaust system. Traditionally the limiting factor of lean burn operation of ICEs is the effectiveness of a TWC which are relatively less efficient at converting excess NOx when operating lean. Operating in stoichiometric conditions, on the other hand, allows for relatively more efficient implementation of a TWC for aftertreatment of ICE exhaust, which are 99% efficient in treating pollutants in automotive exhaust.

Expanding on the above, the internal combustion engine herein with the SOFC module incorporated into the exhaust stream, may preferably run under stoichiometric or slightly rich conditions until relatively high enough temperatures are achieved to activate SOFC to carry-out the reactions noted herein. See again FIG. 1. Preferably, the engine may therefore operate at an equivalence ratio (ER) of 1.0 to 1.1 for a time period sufficient to heat the SOFC to a temperature in the range of 500° C. to 1000° C. Reference to an equivalence ratio is reference to the ratio of actual fuel/air ratio to the stoichiometric fuel/air ratio. In addition, the time period for operation of the engine at an equivalence ratio in the range of 1.0 to 1.1 is preferably in the range of 50 second to 300 seconds.

Accordingly, the internal combustion engine herein would, at start-up, preferably run at an equivalence ratio of 1.0 to 1.1 to heat up the SOFC and when the SOFC achieves such temperature, the engine can then be configured to run at a relatively lean-burn condition. Reference to a lean-burn condition is reference to operating the internal combustion engine at a equivalence ratio that is preferably in the range of 0.50 to 0.77. Such operation at lean-burn conditions may therefore, as noted, preferably occur at start-up. In addition, the internal combustion engine may then be periodically switched to operation at an equivalency ratio of 1.0 to 1.1 to maintain the SOFC at the desired temperature range of 500° C. to 1000° C.

Lean burn internal combustion engines are relatively more simplistic systems compared to stoichiometric engines requiring only a turbocharger and aftercooler, making them a more cost-effective engine system to consumers. Lean burn operation of an ICE also reduces the initial NOx content of the exhaust, as well as increases fuel economy and brake thermal efficiency (BTE) of the engine. As can now be appreciated from the above, implementing secondary injection of a fuel upstream of the SOFC allows the ICEs to be advantageously run in a lean-burn condition, while also providing fuel such as a hydrocarbon fuel to promote operation of the SOFC.

For example, in the case where the hydrocarbon fuel preferably comprises natural gas or methane ($CH_4$), the methane introduced into the SOFC may undergo a steam reforming reaction at the anode where methane and water are converted to carbon monoxide and hydrogen, where the hydrogen provides fuel for the SOFC. It is worth noting, therefore, that the anode is preferably composed of nickel or a nickel alloy, where the nickel provides that catalytic promotion of such steam reforming reaction. Accordingly, the ICE design herein allows one not only to produce additional power (electrical output) more efficiently via the SOFC, but also reap the rewards of lean burn operation optionally paired with the aftertreatment of a TWC.

The level of fuel (hydrocarbon or hydrogen) that may be injected upstream of the SOFC module, into the exhaust stream that is then introduced to the SOFC module, is contemplated to fall in the range of 0.12 kg/min to 0.80 kg/min, more preferably 0.30 kg/min to 0.60 kg/min. This secondary injection of fuel, as alluded to above, will then assist in the oxidation reactions of the cell. As can now be appreciated, if the current density of the cell starts to drop this will indicate a drop in the rate of reaction at the cell which typically means one of two possibilities: (1) the temperature of the SOFC is dropping; or (2) there are not enough reactants to complete the reaction at the desired rate. Also, the high temperature and the nickel reformer at the entrance to the cell will promote the gas shift reaction of water and methane into CO and $H_2$ which can be utilized by the stack to react with NO or $NO_2$. In that context, the secondary injection therefore can make the performance of the cell independent from the performance of the engine.

More specifically, by applying secondary fueling to the exhaust, the control and performance of the SOFC is made relatively more independent from the operation of the engine. That is, this allows for the engine and SOFC to be controlled independently of each other and allow for optimization of engine operation and SOFC performance. Stated another way, the control of the engine and the compositional output of the exhaust stream can now preferably be configured to operate independent of the performance of the SOFC. The engine parameter that the SOFC relies upon is preferably only the exhaust temperature and the engine can therefore be configured to run in a lean burn condition as desired.

The foregoing disclose has been presented to illustrate the invention and is not intended to be limiting. Modification of the identified embodiments would be apparent to persons having ordinary skill in the art.

What is claimed is:

1. A method for operating an exhaust system of an internal combustion engine comprising:
    providing an exhaust conduit configured to receive exhaust from an internal combustion engine;
    providing a secondary fuel injector positioned in said exhaust conduit configured to introduce a fuel along with a solid oxide fuel cell (SOFC) positioned downstream from said secondary fuel injector, wherein said SOFC is configured to receive both said exhaust and fuel from said secondary fuel injector;
    operating said engine at an equivalency ratio of 1.0 to 1.1 to heat said solid oxide fuel cell to a temperature in the range of 500° C. to 1000° C.;
    operating said engine at an equivalency ratio of 0.50 to 0.77 upon reaching the temperature, and
    injecting fuel from said secondary fuel injector into said exhaust conduit wherein said fuel is then introduced into said solid oxide fuel cell.

2. The method of claim 1, wherein said fuel is natural gas, methane, propane, hydrogen or ammonia.

3. The method of claim 1, wherein said engine is operated at an equivalency ratio of 1.0 to 1.1 for a period of time in the range of 50 seconds to 300 seconds.

4. The method of claim 1, wherein said engine is run at an equivalency ratio of 1.0 to 1.1 at engine start-up.

5. The method of claim 1, wherein said engine is periodically run at an equivalency ratio of 1.0 to 1.1.

6. The method of claim 1, wherein said internal combustion engine includes a three-way catalyst (TWC) that receives exhaust from said exhaust conduit and/or from exhaust that has passed through said SOFC.

7. The method of claim 1, wherein said SOFC includes output lines and provides electrical energy output.

8. The method of claim 1, wherein said engine includes an engine electronic control module (ECM) and a SOFC electronic control module in communication with said secondary fuel injector, wherein said SOFC electronic control module monitors the temperature of the SOFC and directs the engine control module to operate said engine at an equivalency ratio of 1.0 to 1.1.

9. The method of claim 1, wherein said fuel introduced into said SOFC is introduced at a rate of 0.12 kg/min to 0.80 kg/min.

10. The method of claim 1, wherein said SOFC is a tubular SOFC.

11. The method of claim 1, wherein said SOFC includes an anode comprising nickel-yittria-stabilized zirconia and a cathode comprising lanthanium strontium manganite yittria-stabilized zirconia.

12. A method for operating an exhaust system of an internal combustion engine comprising:
    providing an exhaust conduit configured to receive exhaust from an internal combustion engine;
    providing a secondary fuel injector positioned in said exhaust conduit configured to introduce a fuel along with a solid oxide fuel cell (SOFC) downstream from said secondary fuel injector positioned to receive both said exhaust and fuel from said secondary fuel injector;
    providing an engine electronic control module and a SOFC electronic control module wherein said SOFC control module is configured to:
        direct said electronic engine control module to operate said engine at an equivalency ratio of 1.0 to 1.1 to heat said solid oxide fuel cell to a temperature in the range of 500° C. to 1000° C. and to operate said engine at an equivalency ratio of 0.50 to 0.77 upon reaching the temperature, and
        direct the injection of fuel from said secondary fuel injector into said exhaust conduit wherein said fuel is then introduced into said solid oxide fuel cell.

13. The method of claim 12, wherein said fuel is natural gas, methane, propane, hydrogen or ammonia.

14. The method of claim 12, wherein said engine is operated at an equivalency ratio of 1.0 to 1.1 for a period of time in the range of 50 seconds to 300 seconds.

15. The method of claim 12, wherein said engine is run at an equivalency ratio of 1.0 to 1.1 at engine start-up.

16. The method of claim 12, wherein said engine is periodically run at an equivalency ratio of 1.0 to 1.1.

17. The method of claim 12, wherein said internal combustion engine includes a three-way catalyst (TWC) that receives exhaust from said exhaust conduit and/or from exhaust that has passed through said SOFC.

18. The method of claim 12, wherein said SOFC includes output lines and provides electrical energy output.

19. An exhaust system for an internal combustion engine comprising:
    an exhaust conduit configured to receive exhaust from an internal combustion engine;
    a secondary fuel injector positioned in said exhaust conduit configured to introduce a fuel;
    a solid oxide fuel cell (SOFC) positioned to receive both said exhaust and introduced fuel; and
    an engine electronic control module (ECM) and a SOFC electronic control module in communication with said secondary fuel injector, wherein said SOFC electronic control module is configured to monitor the temperature of the SOFC and direct the engine control module to operate said engine at an equivalency ratio of 1.0 to 1.1 to heat said solid oxide fuel cell to a temperature in the range of 500° C. to 1000° C. and to operate said engine at an equivalency ratio of 0.50 to 0.77 upon reaching the temperature.

* * * * *